United States Patent [19]

Seabourne et al.

[11] Patent Number: 4,827,081
[45] Date of Patent: May 2, 1989

[54] HELICAL INSULATOR CONTAINING AT LEAST ONE OPTICAL FIBER

[75] Inventors: Judith L. Seabourne, Wiltshire; John S. T. Looms, Surrey, both of England

[73] Assignee: Raychem Limited, London, England

[21] Appl. No.: 235,703

[22] Filed: Aug. 17, 1988

Related U.S. Application Data

[63] Continuation of Ser. No. 99,690, Sep. 18, 1987, abandoned, which is a continuation of Ser. No. 945,199, Dec. 18, 1986, abandoned, which is a continuation of Ser. No. 795,040, Oct. 31, 1985, abandoned.

[30] Foreign Application Priority Data

Nov. 12, 1984 [GB] United Kingdom ............... 8428575

[51] Int. Cl.$^4$ ............... H01B 17/58; H01B 17/60; G02B 6/44
[52] U.S. Cl. ............... 174/139; 174/167; 174/209; 174/212
[58] Field of Search ............... 174/40 R, 43, 137 R, 174/138 R, 139, 167, 173, 179, 209, 211, 212, DIG. 12, 68.3, 135, 136

[56] References Cited

U.S. PATENT DOCUMENTS

| | | | |
|---|---|---|---|
| 2,852,092 | 9/1958 | Fruth et al. | 174/138 R X |
| 2,959,632 | 11/1960 | Peterson | 174/DIG. 12 X |
| 3,288,918 | 11/1966 | Schlein | 174/DIG. 12 X |
| 3,296,366 | 1/1967 | Bronikowski | 174/212 X |
| 3,979,554 | 9/1976 | Fesik et al. | 174/177 |
| 4,380,483 | 4/1983 | Kliger | 156/169 |

FOREIGN PATENT DOCUMENTS

| | | |
|---|---|---|
| 0112163 | 6/1984 | European Pat. Off. . |
| 0125884 | 11/1984 | European Pat. Off. . |
| 599234 | 6/1934 | Fed. Rep. of Germany ...... 174/167 |
| 1903300 | 7/1970 | Fed. Rep. of Germany ...... 267/166 |
| 2716922 | 10/1978 | Fed. Rep. of Germany ...... 174/139 |
| 3242008 | 5/1984 | Fed. Rep. of Germany ...... 174/156 |
| 2301074 | 9/1976 | France ...... 248/74.1 |
| 2544506 | 10/1984 | France ...... 174/69 |
| 547843 | 5/1977 | U.S.S.R. ...... 174/211 |
| 447471 | 5/1936 | United Kingdom . |
| 637696 | 5/1950 | United Kingdom . |
| 915052 | 1/1963 | United Kingdom ...... 174/179 |
| 1292276 | 10/1972 | United Kingdom ...... 174/179 |
| 2091498 | 7/1982 | United Kingdom ...... 174/135 |

OTHER PUBLICATIONS

Retallack, et al., "Fault and Load Current Testing of a Bundle Conductor Spacer", *IEEE Transactions on Power Apparatus and Systems*, No. 68, Oct. 1963, pp. 646–652.

*Primary Examiner*—Laramie E. Askin
*Attorney, Agent, or Firm*—Edith A. Rice; Herbert G. Burkard

[57] ABSTRACT

A high voltage insulator that has a helical configuration in which successive turns are axially spaced apart, and an exposed surface of insulating and substantially non-tracking material. The helical configuration provides a long creepage path length and an ability to shed water. The insulator is sufficiently rigid for it to provide a support, for example, for a high voltage cable or for a fibre optic cable.

6 Claims, 1 Drawing Sheet

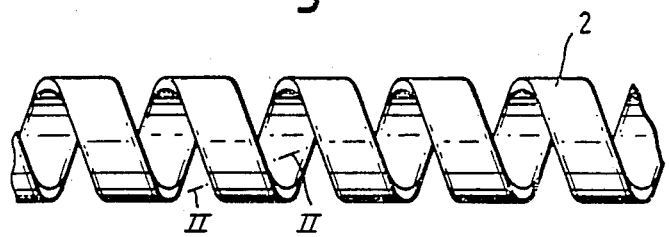
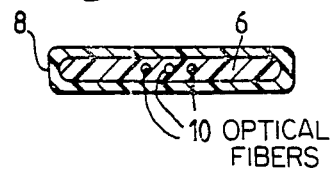
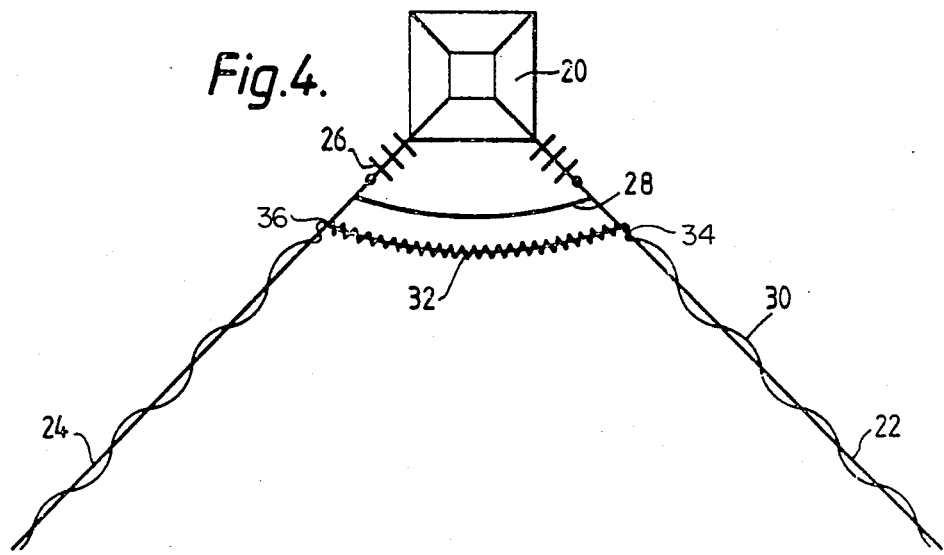

HELICAL INSULATOR CONTAINING AT LEAST ONE OPTICAL FIBER

This application is a continuation of application Ser. No. 07/099,690 filed Sept. 18, 1987 (abandoned) which is a continuation of application Ser. No. 06/945,199 filed Dec. 18, 1986 (abandoned) which is a continuation of application Ser. No. 06/795,040 filed Oct. 31, 1985 (abandoned).

This invention relates to high voltage insulators. The insulator is particularly though not exclusively suitable for use in conjunction with cables at high voltage, for example to support or to restrain movement of a cable, or in a termination. By high voltage is meant a potential of about 1kV or above, for example 33kV, 69kV, or even higher. However, use of the insulator at low voltage or even at earth potential is also envisaged.

High voltage insulators, as used for example in power transmission and distribution, typically comprise an elongate body of electrically insulating material and a fitting at each end for connection to, for example, a power conductor at high voltage and a point at another potential. The elongate body may comprise a ceramic material, for example porcelain or glass, or a composite material such as fiber glass generally with a coextensive sheathing of a polymeric material. In each case, it is usual to provide sheds on the outer surface of the insulator, at least when used in an outdoor or heavily polluted environment, to improve its electrical performance, for example by increasing the creepage path length (that is, the length of the shortest path on the surface of the insulator between the ends, along which a creepage current might flow) of the insulator, and also to prevent the formation of a continuous moisture path from one end of the insulator to the other. The surface of the insulator should have a resistance of at least about $10^6$ ohms per cm of its length, and will advantageously be substantially electrically non-tracking.

In some instances, an insulator may be required that has a degree of flexibility. For example, it is known to use polymeric rods between the different phases of power lines of a distribution system to prevent clashing Furthermore, in published U.K. Patent Application GB-A No. 2132788, a cleat is disclosed for supporting a fiber optic cable where it leaves an overhead high voltage power cable. The material or the cleat is polyvinyl chloride which easily fulfils the mechanical requirements of that fitting but which has poor electrical performance, in particular, poor resistance to tracking. The application of such a cleat in a high voltage environment is therefore limited.

The present invention provides a high voltage insulator that is sufficiently rigid to act as a mechanical support, yet has a degree of flexibility longitudinally and transversely, and that satisfies electrical performance requirements.

Accordingly, in a first aspect the invention provides a high voltage insulator that has a helical configuration in which successive terms are axially spaced apart, and an exposed surface of insulating and substantially non-tracking material, the insulator being arranged such that when disposed substantially vertically and subjected to an axial load of 400N, the resulting axial extension is not more than 20%.

The term helical is used herein to describe a configuration in which an elongate element follows a helical path in which successive turns of the element are axially spaced apart, and in which there is no internal support for the element such that its inner and outer helical surfaces are exposed. Successive turns of the helix may have different diameters, in which case the configuration of the element may be described as spiral. However, in the present context, the term helical is not applicable to spiral elements in which substantially all of the turns are in the same plane, rather than axially spaced apart.

The helical configuration of the insulator enables it to satisfy the electrical and mechanical performance requirements placed upon it. For example, in a harsh electrical environment, any creepage currents which flow along the surface of the insulator of the invention from one end to the other will be forced to follow a helical path. Thus, because of the helical configuration of the insulator, the ratio of the creepage path length to the end-to-end length of the insulator is substantially more than 1:1, generally more than 2:1, and by varying for example the diameter of the insulator and the pitch of the turns, the ratio can be increased to 5:1 or even higher. (It will be understood that when compared with the creepage path length, the end-to-end length of the insulator is measured along the axis of the insulator defined by the bore). Furthermore, by careful selection of the pitch of the helix, it is possible to ensure that water or other liquid contaminants drop off the insulator rather than form a continuous moisture path from one end to the other which could short circuit the insulator. Thus, a long creepage path length, giving good electrical performance, can be obtained compactly within a low axial length; such an insulator is therefore particularly suitable for use in confined spaces. The principal electrical performance requirements of the insulator, which are a long creepage path and an ability to shed water, are therefore satisfied. Several additional advantages of the insulator arise from its helical configuration. For example, unlike the prior art insulators that have a shedded or a convoluted outer surface, the present insulator achieves a high ratio of creepage path length to end to end length without the presence of discontinuities along the creepage path at which discharge activity could take place. Additionally, the insulator can be arranged to have excellent draining characteristics in both horizontal and vertical orientations by selection of the pitch and diameter of the helix according to the orientation of the insulator; consequently, the insulator can be arranged to have excellent self-cleaning properties and thereby maintain a large surface resistance.

It is a significant advantage of the present insulator that its mechanical properties can be changed according to the requirements placed upon it by varying such parameters as the cross-section of the helically wound element, the pitch of the helix, the diameter of the insulator, and the material or materials out of which the insulator is made. Generally, the insulator will be required to provide a supporting or a restraining function and a certain rigidity will be necessary. The insulator will preferably be self-supporting. To enhance its ability as a support, the insulator is arranged such that when disposed substantially vertically and subjected t an axial load of 400N, the resulting axial extension is not more than 20%. Preferably, the insulator extends by not more than 20% when subjected to 500N, more preferably 600N, especially 650N. The element of the insulator will preferably be so stiff that the turns of the helix cannot be unwound by hand. Thus it is preferred that the insulator is arranged such that when a 0.2 m length is subjected to a shearing moment of 1Nm, the angle of twist between opposite ends of that length is not more than 40°, especially not more than 35°, more especially not more than 30°. To form an insulator that is relatively undeformable axially, an element having an I-cross-section or a rectangular cross-section may be used. A more flexible insulator may be formed with an element of square or round cross-section. An elongate cross-section such as a rectangular cross-section is preferred, for ease of manufacture, although this may be modified, for example by making it slightly barrel-shaped, so that water is not retained on what would otherwise be a flat surface. In order to minimise harmful electrical discharge activity on the outer surface, any sharp corners on an insulator having a cross-section that is, for example I-shaped or rectangular, may be avoided, for example by being radiused or otherwise smoothed.

The axial rigidity of the insulator may also be increased by increasing the pitch of the helix, although this change will result in a reduction of the ratio of creepage path length to axial length of the insulator. The diameter of the insulator may be increased to compensate for this.

The helical configuration of the insulator need not be uniform along its length, and can be varied to satisfy mechanical performance requirements. If it is desired to prevent twisting as the insulator is stretched or compressed axially, one half of the insulator may be made as a right hand helix and the other half as a left hand helix. Alternatively, right and left handed helices may be mounted with one at least partially telescoped within the other in order to eliminate rotation on axial extension, or to increase the rigidity of the insulator. Furthermore, the diameter of the insulator may be varied along its length, for example, it may be tapered towards its centre or tapered from one end to the other in order to obtain a desired rigidity profile. The insulator need not have a helical configuration along all of its length. Preferably however, it should have a helical configuration along at least that portion of its length which is intermediate the end regions, that is, the portion of the insulator which extends between for example a conductor and a pylon, when in use.

A further advantage of the present insulator, arising from its helical configuration, is that its performance in environments containing a large amount of airborne pollution is particularly good compared with conventional insulators since the area presented, in profile, is relatively small. Furthermore, contrary to expectations, the present insulator also has an efficient aerodynamic shape since in the absence of radial protuberances, the effective shape presented to the air is cylindrical.

Whilst stiffness in the insulator is necessary for it to fulfill its function as a support, a degree of flexibility, (axial, transverse or both), can be advantageous for certain applications. For example, in environments highly polluted with particulate material such as cement dust, accumulation and consolidation of any particulate material is prevented by continuous flexing of the insulator due to wind-buffeting. The electrical performance of the external surface will thus be maintained. A certain degree of flexibility of the insulator can also be used to advantage when it is employed as an interconductor tie: the insulator can be used to restrain unwanted motion such as oscillation of the conductors, and to prevent transfer of such motion between conductors. It is therefore preferred that, for certain applications, the insulator is arranged such that when a 200 mm length is subjected to a bending load of 10N, it is deflected through between 4° and 10°, more preferably between $5\frac{1}{2}$° and $8\frac{1}{2}$°, especially about 7°.

The construction of the insulator is such that it has an exposed outer surface of electrically insulating and non-tracking material. Preferably the insulator is constructed from one or more materials all of which are insulating. The term "non-tracking" is used to describe a material which has an initial tracking voltage of more than 3 kV when tested in accordance with ASTM-D2303-64T (wetting agent Triton X-100), a test method which uses the inclined plane liquid contamination test and is designed to represent service exposure of insulators under polluting conditions. Examples of non-tracking materials are given in British Patent Specifications Nos. 1,292,276, 1,284,081, 1,284,082, 1,303,432, 1,337,951 and 1,337,952.

The construction and many advantages of the present insulator make it particularly attractive for use in many applications. For example, it could be used as a support for overhead power lines, particularly when the insulator is designed so as to be rigid. In other instances, a relatively flexible insulator may be desirable. For example, the insulator could be used as a tie or anti-clash device, to hold two high voltage conductors apart. The insulator could also be used as a conduit for a fiber optic cable that is associated with an uninsulated electrical conductor at high voltage, as disclosed, for example in GB-A No. 2132788. The insulator in such an application may be used, for example, at a joint, or in a phase to ground termination of the fiber optic cable to guide the fiber optic cable from high voltage to For example, in a situation in which the ends of two high voltage conductors that carry a fiber optic cable are attached to a pylon by means of tension insulators, electrical connection between the conductors is made by means of a jumper lead. It is preferred to locate the fiber optic cable between the conductors independently of the jumper lead; and the present insulator may be used as a conduit between the conductors with the fiber optic cable passing through the bore that is defined by the helix. Since the insulator has an outer surface of insulating and substantially non-tracking material, it can be used between conductors at different potentials or phases, and between a high voltage conductor and ground. However, the electrical properties of the outer surface also make the insulator attractive for use between high voltage conductors at the same potential in order that corona discharge activity is minimised, particularly in polluted or wet environments.

The material of the present insulator may be, for example, unitary or composite, the selection being made according to the electrical and mechanical requirements of the insulator. A preferred construction of insulator comprises a rigid core of an insulating material, such as for example a fiber reinforced resin, and an outer sheath of a material that is electrically insulating and substantially non-tracking. A preferred resin is the thermosetting epoxy resin marketed under the trade mark Fibredux 9139. The outer sheath of material may be provided by the recovery onto the core of a recoverable polymeric tube. A recoverable article is an article the dimensional configuration of which may be made to change when subjected to an appropriate treatment. The article may be heat-recoverable such that the dimensional configuration ma be made to change when subjected to a heat treatment. When a fiber-reinforced resin is used as the core material of an insulator, its formation into a helix confers a secondary advantage in that the electric field, associated with the insulator, particularly when dry, is not parallel to the fibers. The incidence of interfacial tracking is therefore reduced compared with that in conventionally shaped fiber-reinforced resin insulators.

In a further aspect, the present invention provides a method of making a composite article in such as an insulator, the method comprising the steps of:

forming a core of a curable polymeric material;
enclosing the core within a heat-recoverable tube;
heating the article to a temperature above the recovery temperature of the tube so as to cause the tube to recovery radially and to compact the core material;

Preferably, the material of the core is a thermosetting polymer, in which case the curing temperature should be above the recovery temperature of the tube so that the material can be cured after recovery of the tube by the application of further heat.

Using the present method, composite articles can conveniently be formed in shapes that would otherwise be extremely difficult, if not impossible, to produce; the method finds particular application in the production of articles comprising components that fulfill different functions such as a mechanically rigid helical core with a polymeric outer sheath The core could be made, for example by extrusion, or, particularly when it comprises a fiber-reinforced resin, by laying up or lamination.

Preferably, the recoverable tube is heated and thereby recovered progressively along its length, so as to force air out from one end and to form a substantially void-free interface between the core and the tube. It is very desirable to use materials for the core and the tube that are chemically compatible such that one will form a good bond to the other, for example, when the core is cured.

Before the curable material has been cured, the article may be formed into a suitable configuration, for example, it may be wound helically around a mandrel to form a helical configuration. In this case, the mandrel may be heated to the recovery temperature of the tube, so that the tube recovers progressively along its length as the article is wrapped around the mandrel. However, in some cases, the article could be deformed before the recoverable tube has been positioned over the curable core.

It is envisaged that one or more optical fibers be incorporated into the body of the helical insulator, for example into the mechanically rigid core, for the transmission of optically encoded data. These may be laid into the insulator during manufacture or they may be introduced subsequently into an insulator that has been formed with a hollow configuration.

Embodiments of helical insulators of the present invention will now be described by way of example with reference to the accompanying drawings, in which;

FIG. 1 shows an elevation of a helical insulator;
FIG. 2 shows a cross-section of insulator shown in FIG. 1 along the line II—II;
FIG. 3 shows a cross-section of another embodiment of helical insulator; and
FIG. 4 shows a plan view of a helical insulator installed at a pylon and acting as a conduit for a fiber optic cable.

Referring to the drawings, FIG. 1 shows a helical insulator that could be used, for example, as a conduit for a fiber optic cable at a pylon in a 132 kV overhead distribution system. The insulator 2 comprises a fiber-reinforced resin core and a sheath of an insulating and substantially non-tracking polymeric material.

As shown in FIG. 2, the rigid fiber reinforced resin core 6 of the insulator is firmly bonded along a void free interface to an outer sheath 8 of electrically insulating and substantially non-tracking polymeric material. The core of the insulator comprises a laminate of eight sheets of glass cloth that have been impregnated with a curable epoxy resin such as Fibredux 9139. The cross-section of the insulator is essentially rectangular, but with the corners rounded off to minimise discharge activity. Rectangular shape ensures longitudinal rigidity of the insulator.

The insulator shown in FIG. 3 is identical to that shown in FIG. 2 except that optical fibers 10 are incorporated into the core 6.

FIG. 4 shows a pylon 20 in a high voltage transmission system at which the direction of the conductors 22,24 changes. The conductors are attached to the pylon through tension insulators 26 and are connected electrically by means of a jumper lead 28. A fiber optic cable 30 for the transmission of optically encoded data is wound around the conductor 22 and passes to conductor 24 through.. the bore of a helical insulator 32 that is rigidly mounted at 34 and 36 onto the conductors 22,24 respectively at its ends. Typically the insulator will have the following dimensions:

| | |
|---|---|
| creepage length to axial length | 3:1 |
| bore | 21 mm |
| pitch | 45 mm |
| cross-section of element | 20 mm × 4 mm |

In another embodiment, a phase to ground insulator of helical configuration and of an element having a circular cross-section, which is suitable for use in a 35 kV railway system, has the following dimensions:

| | |
|---|---|
| end-to-end length | 500 mm |
| creepage path length | 1500 mm |
| bore | 10 mm |
| pitch | 15 mm |
| cross-section of element | 4.5 mm diameter |

The mechanical properties of a helical insulator were determined. The insulator was formed from a rectangular strip with rounded corners, having dimensions approximately 18 mm×5 mm. The strip was formed into a helix having an outer diameter 20 mm and a pitch 30 mm.

The insulator was found to have the properties of a stiff mechanical spring. The following tests were carried out on a 200 mm length:

| Test | Result |
|---|---|
| Suspended vertically and subjected to an axial load of 670 N | 20% axial extension |
| Subjected to a bending load of 10 N at one end | 7° beam deflection between the ends |
| Shearing moment 1 Nm | 30° twist between the ends |

We claim:
1. A flexible high voltage insulator comprising a body that has a helical configuration in which successive turns are axially spaced apart, the insulator body (A) having (i) an exposed surface of insulating and non-tracking material and (ii) at least one optical fiber extending helically therethrough and (B) being of a cross-section and material such that (i) when arranged substantially vertically and subjected to an axial load of 400N, the resulting axial extension is not more than 20% (ii) when a 200 mm length thereof is subjected to a bending load of 10N, it is deflected through an angle between 4° and 10°.

2. A flexible high voltage insulator as claimed in claim 1, which is arranged such that when a 0.2 meter length thereof is subjected to a shearing moment of 1Nm, the angle of twist between opposite ends of that length is not more than 40°.

3. A flexible high voltage insulator as claimed in claim 1, in which the ratio of creepage path length to end-to-end length is at least about 2:1.

4. A flexible high voltage insulator as claimed in claim 1, in which said body comprises an inner strengthening core member, and an outer tubular member enclosing said core member, and in which said at least one optical fiber extends through said core member.

5. A flexible high voltage insulator as claimed in claim 4, in which said outer tubular member comprises a recovered tube of recoverable polymeric material.

6. A flexible high voltage insulator as claimed in claim 4, in which said core member is formed from a fiber reinforced resin.

* * * * *